G. A. BRADY & F. F. WARNER.
Type Writing Machine.

No. 202,143. Patented April 9, 1878.

4 Sheets—Sheet 2.

G. A. BRADY & F. F. WARNER.
Type Writing Machine.

No. 202,143. Patented April 9, 1878.

Attest:
James H. Coyne
C. J. MacKellar

INVENTORS:
Gilbert A. Brady
Francis F. Warner
By Wm. F. Harbach their
Attorney.

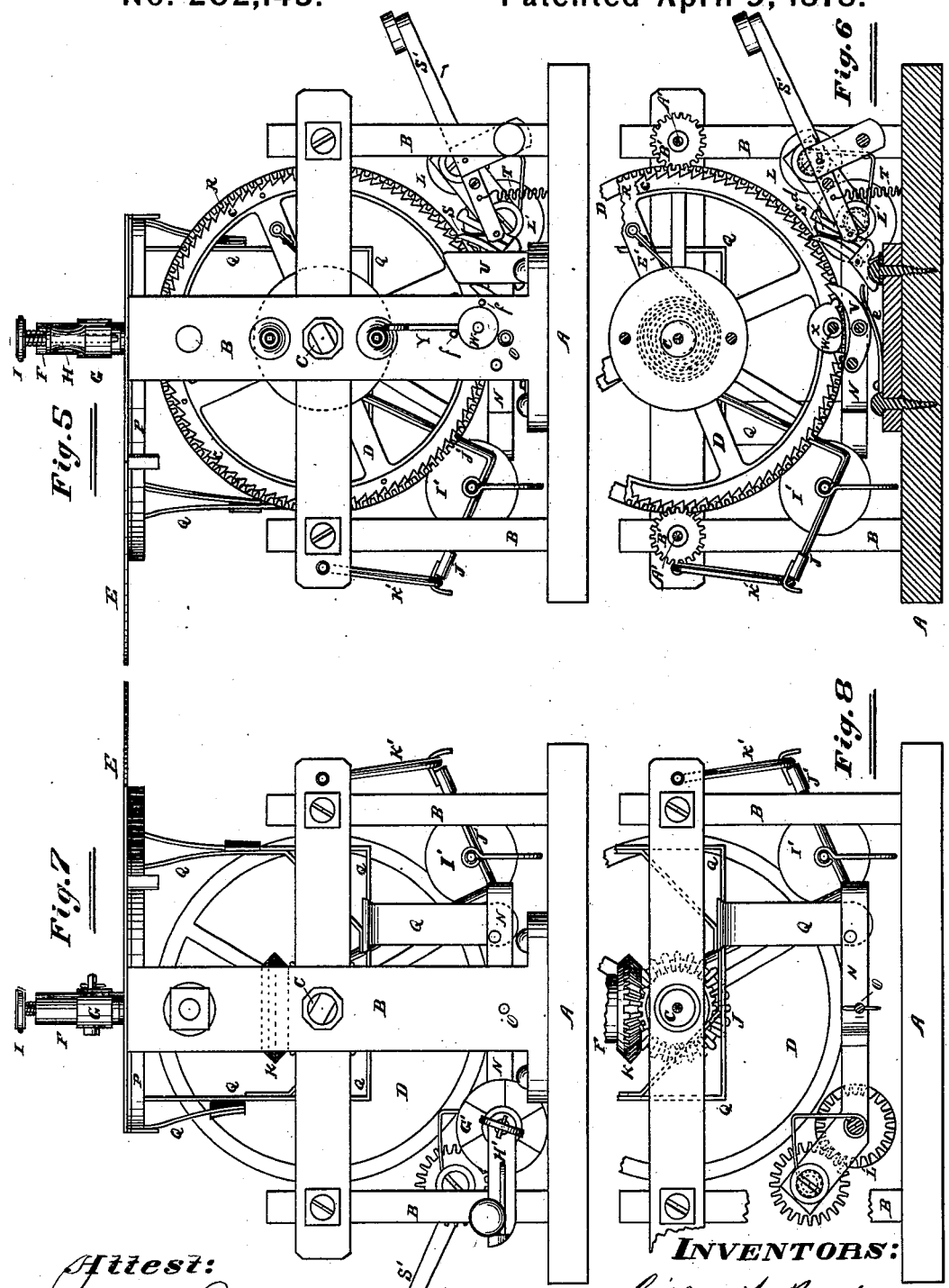
4 Sheets—Sheet 3.
G. A. BRADY & F. F. WARNER.
Type Writing Machine.
No. 202,143. Patented April 9, 1878.

G. A. BRADY & F. F. WARNER.
Type Writing Machine.

No. 202,143. Patented April 9, 1878.

Attest:
James N. Coyne
v. J. Mackellar

INVENTORS:
Gilbert A. Brady
Francis F. Warner
By Wm. F. Harbach Shu
Attorney.

UNITED STATES PATENT OFFICE.

GILBERT A. BRADY AND FRANCIS F. WARNER, OF CHICAGO, ILLINOIS.

IMPROVEMENT IN TYPE-WRITING MACHINES.

Specification forming part of Letters Patent No. 202,143, dated April 9, 1878; application filed November 17, 1877.

*To all whom it may concern:*

Be it known that we, GILBERT A. BRADY and FRANCIS F. WARNER, both of Chicago, in the county of Cook and State of Illinois, have jointly invented certain new and useful Improvements in Type-Writing Machines, of which improvements the following is a specification, reference being had to the accompanying drawing, forming a part hereof, and in which—

Figure 1:
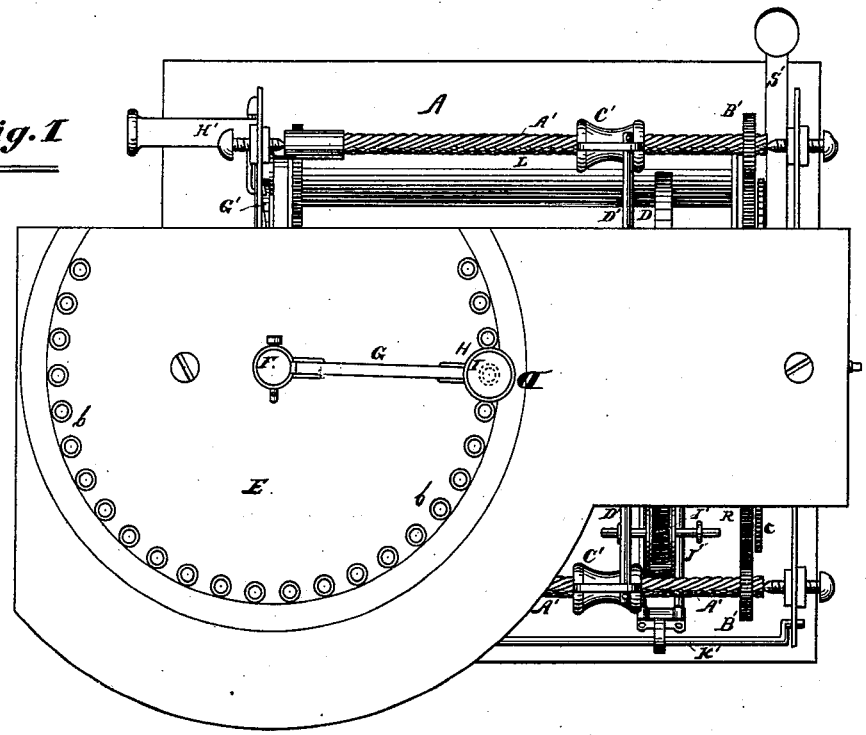
Figure 2:
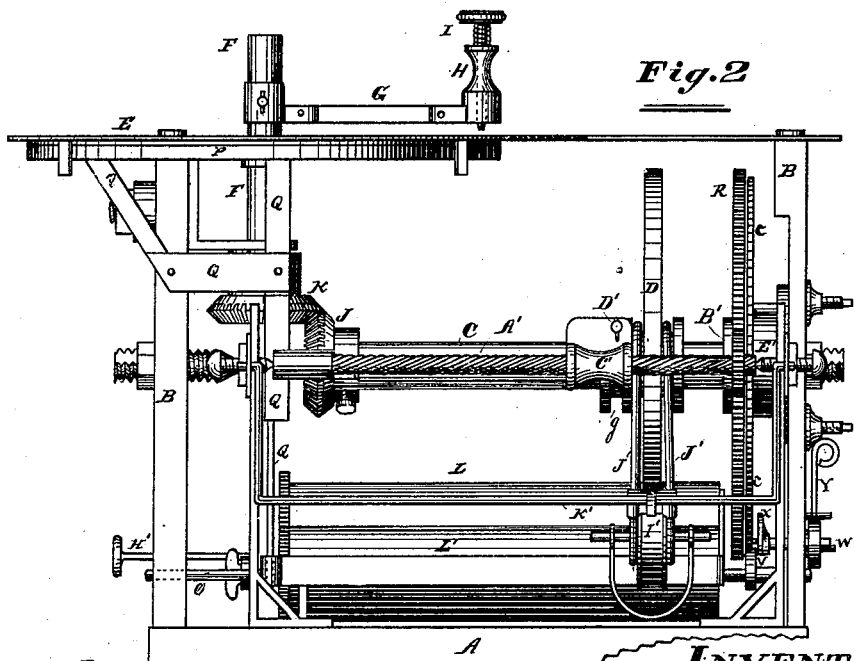
Figure 3:
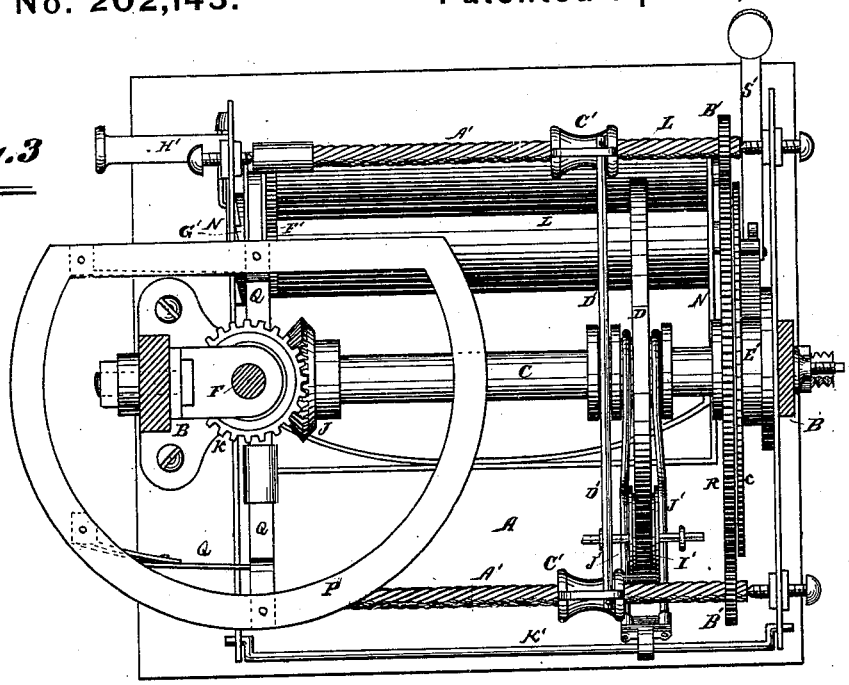
Figure 4:
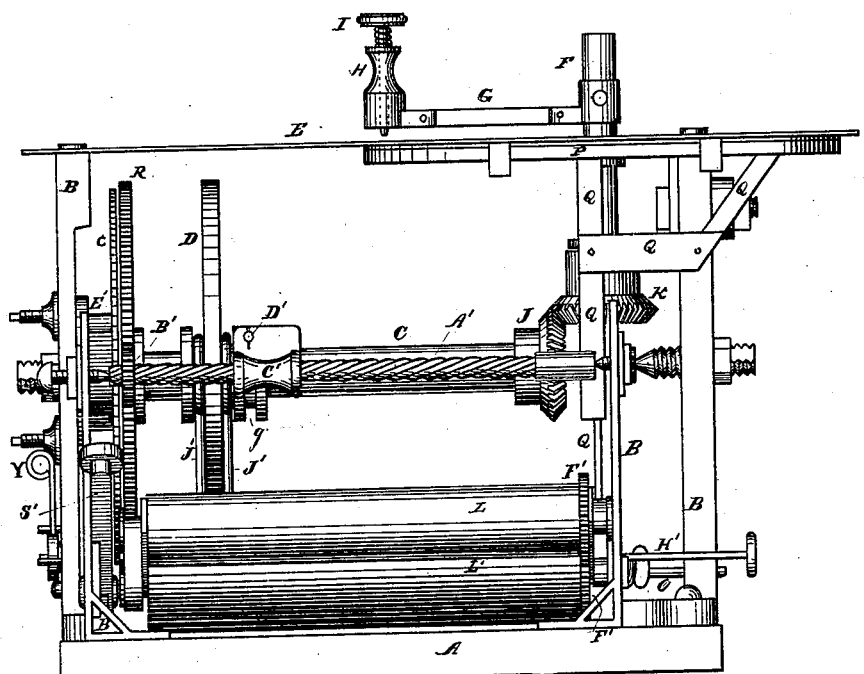
Figure 10:
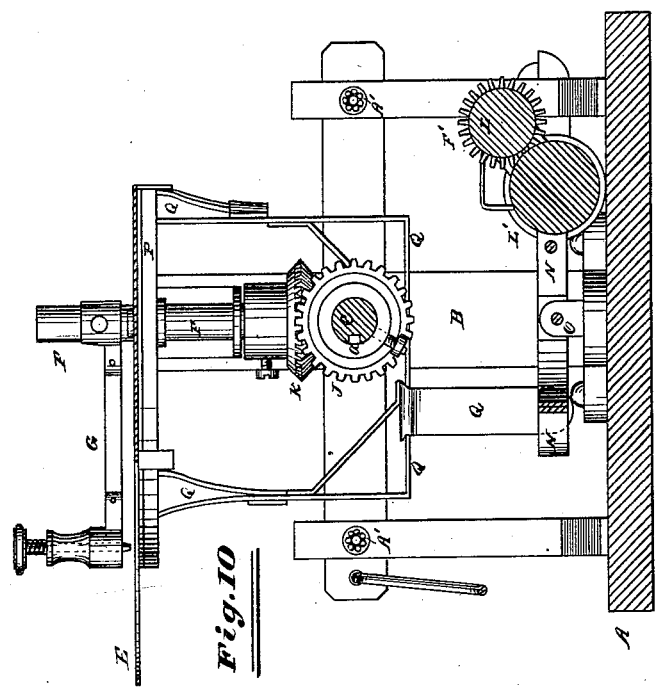
Figure 11:
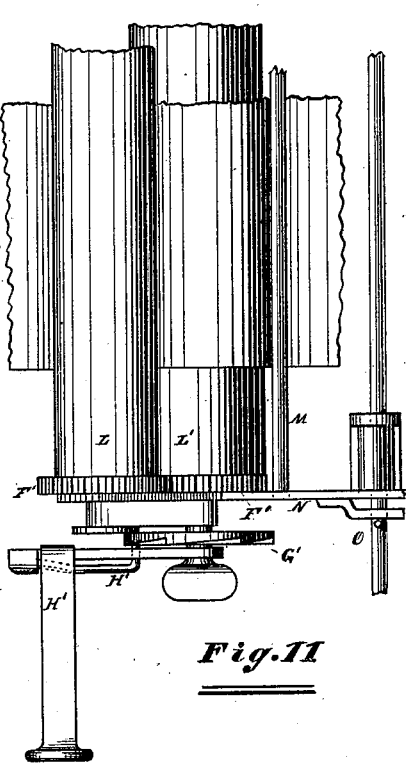
Figure 9:
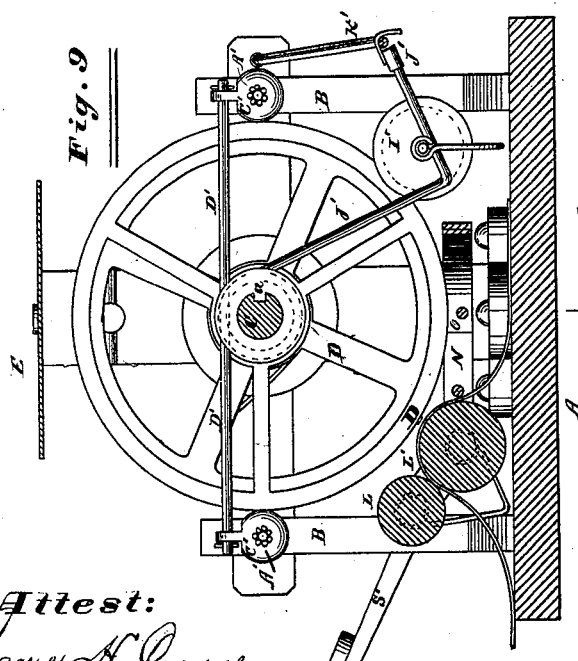
Figure 12:
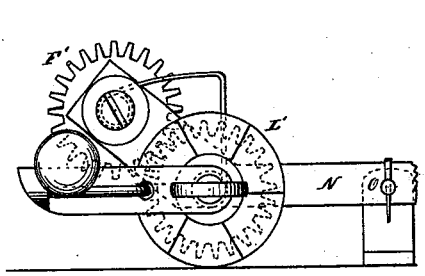

Figure 1, Sheet 1, is a top or plan view of a machine embodying our improvements; Fig. 2, Sheet 1, a rear view; Fig. 3, Sheet 2, a top view, the index or graduated disk or plate being removed; Fig. 4, Sheet 2, a front view; Fig. 5, Sheet 3, an end view of one end of the machine; Fig. 6, Sheet 3, a like view, one of the supporting-standards being removed; Fig. 7, Sheet 3, an end view of the opposite end of the machine; Fig. 8, Sheet 3, a like view, certain parts being removed to show the remaining parts more fully; Fig. 9, Sheet 4, a cross-section from front to rear, taken between the type-wheel and one end of the machine; Fig. 10, Sheet 4, a like section, taken between the type-wheel and the other end of the machine; Fig. 11, Sheet 4, a top or plan view of the paper-holding mechanism; and Fig. 12, Sheet 4, an end elevation of the parts shown in Fig. 11.

Our invention relates to that class of type-writing machines whereby letters, words, figures, &c., may be properly printed in lines extending across the paper. Our object is to improve the construction and operation of machines of this class; and to that end our invention consists of a type-writing machine in which the principal features of novelty are as follows, to wit: A rotary type-wheel capable of being moved laterally on its shaft; a face-plate graduated to correspond to the distance apart of the type on the type-wheel, and having thereon characters corresponding to those on the said wheel, and a vibrating paper-holder or platen, all operating in such a manner in the same machine that the type may be carried to the same line, one after another, the paper brought against the type so presented, and the proper space made between the printed characters.

In connection with these parts, but as minor features of our invention, we also employ means for rotating the type-wheel; for moving the type-wheel laterally on its shaft; for returning the type-wheel to the margin of the paper; for feeding the paper line by line; for actuating the paper-holder or platen, and for inking the type; but while we claim some of these minor features, we do not intend to be restricted to them, as various other well-known or suitable means may be employed in their stead.

In the drawing, A represents the base-plate or bottom of the machine, and to which either the standards B B or suitable inclosing-walls may be applied. C is a shaft, having therein the longitudinal groove $a$. D is a type-wheel, loosely mounted on the shaft C, but keyed thereto by means of a rib within the wheel-hub, the rib being nicely fitted into the groove. The type, in practice, extend radially from the wheel at suitable distances from each other, as is usual in this class of wheels.

E is the face-plate. This plate is spaced or graduated in one or more circles or arcs, and letters, numerals, or other signs or characters are made thereon, the spaces between the characters corresponding to the spaces between the type, and the characters on the face-plate being the duplicates of those on the type, and arranged in the same order. Near each character on the face-plate are the holes $b\ b$, made flaring by preference. F is a shaft projecting through the face-plate, and arranged in the center of the circle or arc in which the holes $b\ b$ are made. G is a crank-arm on the shaft F, and H is a crank-handle, into which is set the vertically-yielding pin I, arranged to enter the holes $b\ b$. J and K are gear-wheels, rigidly mounted on the shafts C and F, respectively, and engaging each other.

L and L' are rollers, and M is a cross-bar or rod, all of which are parallel to each other, and are carried by the frame N, which is mounted on the rod O, or other suitable bearing. P is a platform, arranged directly underneath the holes $b\ b$, and connected, by means of a supporting-frame, Q, to the rear part of the frame N, these frames being pivoted or jointed to each other.

R is a spur-wheel, rigidly mounted on the shaft C, and c c are ratchet-teeth carried by the wheel R. S is a push-pawl on the inner end of the lever S', and is arranged to engage the teeth c c when the outer end of the lever is depressed. A spring, T, draws the inner end of the lever S' downward when its outer end is released, and when the inner end of the lever is at its lowest point the pawl S is withdrawn from its engagement with the teeth c c. U is a guide to carry the pawl S to its engagement with the teeth c c when the outer end of the lever S' is depressed. A spring, d, holds the pawl S to the guide U. This pawl may be jointed and pivoted to its lever, as shown in Fig. 6. V is a stop-pawl, resting on a spring, e, which holds the pawl V to the teeth c c. W is a shaft, carrying the eccentric X, arranged to push the pawl V from its engagement with the teeth c c, and Y is a crank-arm for rocking the shaft W, so that the eccentric thereon will act on the pawl V. f f are stop-pins for limiting the movement of the arm Y.

A' A' are screw-shafts or rotary worms parallel to the shaft C, and B' B' are pinions on the shafts A' A', and are arranged to engage the wheel R. C' C' are traveling nuts on the shafts A' A'. D' is a cross-bar or rod, passing through wings on the nuts C' C', and resting in a groove, g, in the periphery of the hub of the wheel D. E' is a convolute spring, one end of which is attached to the wheel R and the other to a fixed part—for example, to the standard B nearest thereto.

F' F' are spur-wheels engaging each other, and mounted rigidly on the rollers L and L', respectively. G' is a ratchet-wheel, rigidly attached to the axle or spindle of the roller L or L', and H' is a push-pawl for actuating the wheel G'. I' is an ink-roller, carried by the bent arm J', suspended freely on the hub of the wheel D, and freely supported at its outer end by the rod K'.

The operation of the machine is as follows, it being understood that the sheet to be printed upon is arranged between the rollers L and L', and underneath the rod M, so as to be properly presented to the type-wheel D: To print a word, the arm G must be turned until it is radial to the letter (on the plate E) which is first in the word to be printed. This movement, owing to the engagement of the wheels C and F, carries a like letter on the type-wheel to a point directly opposite the line in which the word is to be printed upon the paper. The pin I must then be depressed, and this depression causes the pin to enter the flaring hole underneath it. If the arm was not made accurately radial to the letter, the pin I, during its descent, will correct the position of the arm, and consequently the position of the type. The pin I, during its descent, will strike and depress the platform or part P, thus causing the rollers L and L' to move upward and carry the paper to the type presented to it, so that an impression will be made, it being understood that the type was inked by contact with the ink-roller. To produce a space between the letter now printed and the one to be next printed, the lever S' must be depressed. The shafts A' A' are thus rotated, and the nuts C' C', being prevented from rotating, move forward on their shafts and carry the type-wheel forward or laterally on its shaft, so that the wheel is no longer over or opposite the letter last printed. If the same letter is to be next printed, the pin I is again depressed, as before, and the letter will be twice printed, with a proper space between the printed letters. If a different letter is to be printed, the type-wheel must be rotated, in the manner already described, until the letter to be printed is properly presented, and a depression of the pin I will cause that letter to be printed. The acts now described are repeated until a line of the paper is printed upon, two depressions of the lever S' being made in succession in order to produce a proper or sufficient space between the words. When the end of the line is reached, the arm Y should be so moved as to carry the pawl V from its engagement with the teeth c c. The wheel R, being thus released, is rotated in a direction the reverse of that which follows the depression of the lever S', and the type-wheel is thus returned to its original position on its shaft. This reverse rotation is caused by the action of the spring E' on the wheel R, the spring having been wound by the act of depressing the lever S'. In order to feed the paper so that another line will be printed upon, the pawl H' must be pushed forward.

It will be perceived that the ink-roller travels with the type-wheel. One traveling nut, C', instead of two, may be employed to carry the type-wheel laterally for spacing. It will also be perceived that the arm G is not only the means employed to enable the operator to rotate the type-wheel, but that this arm is also the medium through which the paper is carried to the type-wheel, and the means by which the position of the type is corrected.

Having thus described our invention, what we claim as new, and desire to secure by Letters Patent, is—

1. A rotary type-wheel laterally sliding on its shaft, a face-plate graduated and marked to correspond to the type, and a vibrating paper-holder or platen, for the purposes specified.

2. The combination of a rotary type-wheel laterally sliding on its shaft, a face-plate graduated and marked to correspond to the type, an index arm or crank in connection with gearing for rotating the type-wheel, a vibrating paper-holder or platen, and mechanism for actuating the same, and mechanism, substantially as described, for sliding the type-wheel laterally on its shaft, for the purposes set forth.

3. A type-writing machine wherein a rotary type-wheel laterally movable on its shaft is moved thereon by means of one or more nuts, mounted on one or more screws or worms and connected to the type-wheel, for producing space between the printed characters, substantially as specified.

4. The combination, in a type-writing machine, of a rotary type-wheel, a graduated and perforated or open face-plate, a crank and gearing for rotating the type-wheel, a yielding pin in the crank, and a vibrating paper-holder or platen, having connected thereto a yielding platform, arranged to be struck by the yielding pin at the several graduated points on the face-plate, substantially as and for the purposes specified.

GILBERT A. BRADY.
FRANCIS F. WARNER.

Witnesses:
GEO. A. BOSWELL,
D. J. MACKELLAR.